United States Patent [19]

Sarrazin et al.

[11] Patent Number: 5,502,269
[45] Date of Patent: Mar. 26, 1996

[54] PROCESS FOR THE ISOMERIZATION OF EXTERNAL OLEFINS TO INTERNAL OLEFINS CONCOMITANTLY WITH DIOLEFIN HYDROGENATION

[75] Inventors: Patrick Sarrazin, Rueil Malmaison; Charles Cameron, Paris; Jean-Paul Boitiaux, Poissy; Pierre Dufresne, Rueil Malmaison, all of France

[73] Assignee: Institut Francais du Petrole, Rueil Malmaison, France

[21] Appl. No.: 282,474

[22] Filed: Jul. 29, 1994

[30] Foreign Application Priority Data

Jul. 30, 1993 [FR] France .................................. 93/09529

[51] Int. Cl.⁶ .......................................................... C07C 5/23
[52] U.S. Cl. ............................................. 585/668; 585/670
[58] Field of Search ........................................ 585/568, 570

[56] References Cited

U.S. PATENT DOCUMENTS 3,290,404 12/1966 Howman et al. ................... 260/683.2
4,132,745 1/1979 Amigues et al. .................... 260/683.2
4,724,274 2/1988 Boitiaux et al. ......................... 585/668

FOREIGN PATENT DOCUMENTS 2627104 8/1989 France .

*Primary Examiner*—Helane Myers
*Attorney, Agent, or Firm*—Millen, White, Zelano & Branigan

[57] ABSTRACT

The present invention concerns a process for the isomerization of external olefins to internal olefins, the feedstock also containing diolefins, using a palladium based catalyst which contains 0.05% to 10% by weight of sulphur, said catalyst being treated before loading into the reactor with at least one organic sulphur-containing compound dissolved in a solvent, then activated in a neutral or reducing atmosphere at a temperature of between 20° C. and 300° C., before being brought into contact with the feedstock.

17 Claims, No Drawings

5,502,269

PROCESS FOR THE ISOMERIZATION OF EXTERNAL OLEFINS TO INTERNAL OLEFINS CONCOMITANTLY WITH DIOLEFIN HYDROGENATION

BACKGROUND OF THE INVENTION

The present invention concerns a process for selective hydrogenation of diolefins concomitantly with isomerization of external olefins to internal olefins in liquid hydrocarbon cuts such as $C_4$, $C_5$, and $C_6$ cuts from steam cracking or catalytic cracking which contain diolefins mixed with olefins. To make use of these olefins, they must be freed of diolefins by selective hydrogenation. In addition, it is occasionally advantageous to isomerize external olefins to internal olefins when they are of greater importance to downstream processes, for example alkylation or etherification units.

Such treatments (selective hydrogenation and isomerization) are carried out using catalysts which are based on at least one group VIII metal deposited on an amorphous or crystalline support. Palladium is currently used.

U.S. Pat. No. 4,724,274 describes a process for the preparation of 2-methyl-2-butene (internal olefin) from a $C_5$ feedstock containing 2-methyl-1-butene (external olefin) and at least one n-pentene, using a catalyst which is based on a group VIII metal with a sulphur-containing compound present in the feedstock ($H_2S$, thiol, thiophene . . . ) at a concentration of 2 to 50 ppm. Linear olefins are selectively hydrogenated and 1-butene is isomerized. The process is carried out at a temperature of between 60° C. and 120° C. and a pressure of between 5 and 100 bars.

These palladium catalysts, however, do not isomerize external olefins sufficiently in the processes cited above. Even if the feedstock to be treated contains traces of sulphur, in order to increase the activity of the metal, a sulphur-containing compound must occasionally be introduced into the catalyst in the reactor (in situ) before bringing the catalyst into contact with the reactive feedstock.

This sulphuration (due to the presence of sulphur in the feedstock and/or in situ sulphuration of the catalyst) is, however, difficult to carry out since the sulphur-containing compound must be very well distributed over the whole of the catalytic bed in order to have a substantial effect on selectivity. In addition, this procedure can be long and costly; this leads to production losses or to hazardous operation depending on the sulphur-containing compounds employed.

SUMMARY OF THE INVENTION

More precisely, the object of the invention is to provide a process for the isomerization of external olefins contained in a feedstock to internal olefins, said liquid feedstock containing diolefins, in the presence of a palladium based catalyst and in the presence of hydrogen, the isomerization conditions of the process corresponding to a temperature of between 20° C. and 200° C., a pressure of between 1 and 50 bars, a VVH of between 0.5 and 10 $h^{-1}$ and an $H_2$/diolefin molar ratio of between 0.5 and 5, wherein the catalyst is treated, before being loaded into the isomerization reactor, with at least one sulphur-containing compound which is dissolved in a solvent, and wherein the catalyst obtained, containing 0.05% to 10% by weight of sulphur, is loaded into the reactor and activated in a neutral or reducing atmosphere at a temperature of between 20° C. and 300° C., a pressure of between 1 and 50 bars and a VVH of between 50 and 600 $h^{-1}$, and in that the feedstock is brought into contact with said activated catalyst under isomerisation conditions.

We have discovered that, surprisingly, the introduction of organic sulphur-containing compounds improves the isomerizing activity of the catalyst, despite intermediate handling in air. They also remove the requirement for a sulphur-containing compound to be added to the feedstock.

Without limiting the invention to these compounds alone, the compounds used can be sulphur-containing compounds, in particular organic sulphur-containing compounds which can decompose during catalyst activation treatment in the reactor. This activation is carried out in a neutral or reducing atmosphere at a temperature between 20° C. and 300° C., preferably between 60° C. and 210° C., a pressure of between 1 and 50 bars, preferably 3 to 20 bars, and an hourly volume ($m^3$) of feedstock per $m^3$ of catalyst (VVH) of between 50 and 600 $h^{-1}$, preferably 100 to 200 $h^{-1}$.

Particular organic sulphur compounds which can be used in the present invention are organic alkyl or aryl sulphides or organic alkylaryl or arylalkyl sulphides. Examples are butylethylsulphide, diallylsulphide, dibutylsulphide, dipropylsulphide, thiophene, dimethylthiophene and ethylthiophene.

More generally, the following may be used either separately or in combination: thiols (thioalcohols, mercaptans, thiophenols) with formula $R_1$—SH where $R_1$ is an organic radical, thioethers with formula $R_1$—S—$R_2$, where $R_1$ and $R_2$ may be identical or different, organic disulphides with formula $R_1$—S—S—$R_2$ and HO—$R_1$—S—S—$R_2$—OH type disulphides.

An organic sulphur-containing compound may also be selected from the group constituted by thiodiazoles, organic thioacids, thioamides, thioesters and thiophenols. Examples are thiobenzoic acid, thiocresols, 3,3-thiodipropionic acid, 2,3,6-trimethylthiophenol, methylthioglycollate, naphthalene 2-thiol, phenyl isothiocyanate, 2-phenyl thiophenol, thioacetamide, thiobenzamide, 2,6-dimethylthiophenol, 3,5-dimethylthiophenol, 2,2'-dinitrodiphenyldisulphide, 2,5-dithiobiurea, ethyl thioglycollate, 2-methoxy thiophenol, and 3-methoxy thiophenol.

The process of the invention may also be carried out in the presence of other types of sulphur-containing additives. Thus mercapto-alcohols with the following formula can be cited:

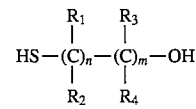

where n and m are whole numbers, $R_1$, $R_2$, $R_3$, $R_4$, which may be identical or different, are hydrogen atoms or alkyl, aryl, aralkyl etc. . . . organic radicals with 1 to 20, preferably 1 to 6 carbon atoms per molecule; preferably, n=1–10 (1–2, for example) and m=1–10 (1, for example).

The following may also be cited: monothioglycols such as monothioethylene glycol, dithioglycols such as dithiopropylene glycol, dithiobenzenes such as dithioresorcin, heterocycles substituted with mercapto groups such as mercaptopyridine, mercaptopyrimidine etc. . . . , dihydroxyalkyl sulphides such as thiodiethylene glycol ($S(CH_2CH_2OH)_2$), thiodipropylene glycol etc . . . , diaryl sulphides such as diphenyl sulphide, diaralkyl sulphides such as dibenzyl sulphide, cyclic thioethers and their substituted derivatives (ethylene sulphide, thiophene, thiazole, thiopyrone, thioxanthone, thioxanthhydrol, 1,4-thioxane etc. . . . ) and S alkyl ethers of mercaptan substituted heterocycles (2-methylthio 4,6-diaminopyrimidine etc. . . . ).

More particular examples of the above families of compounds are dimethylsulphoxide, ethylthiol ethanol, thioglycolic acid, dithioglycol and organic disulphides, particularly those with formula HO—$R_1$—S—S—$R_2$—OH as indicated above or HO—$(CH_2)_x$—S—$(CH_2)_{x'}$—S—$(CH_2)_{x''}$—OH where $R_1$ and $R_2$ are as defined above, and x, x', x", which may be identical or different, are whole numbers.

More particular examples are diethanol disulphide or 2,2-dithio bis-ethanol (DEODS) with formula HO—$C_2H_4$—S—S—$C_2H_4$—OH which is particularly soluble in water, glycols and polyglycols.

A polysulphide with formula R—$S_n$—R' may also be used, where n is a whole number between 3 and 20 atoms, preferably 4 to 8 and more particularly 5 to 7, R and R', which may be identical or different, represent organic radicals each containing 1 to 150 carbon atoms per molecule, preferably either 10 to 60 carbon atoms or 5 to 40 carbon atoms, more particularly 7 to 16, the radicals being selected from the group constituted by saturated or unsaturated, linear or branched or naphthene type alkyl radicals, aryl radicals, alkylaryl radicals and arylalkyl radicals. The various radicals may contain at least one heteroatom. R' may also represent a hydrogen atom.

A preferred example of a polysulphide is ditertiododecylpolysulphide (n=5) where R and R' each represent a tertiododecyl radical.

This product is sold, for example, by ELF AQUITAINE under the trade name TPS 32 since it contains 32% by weight of sulphur. Ditertiononylpolysulphide (n=5) may also be cited, where R and R' each represent a tertiononyl radical.

The pretreatment agent is dissolved in a suitable solvent which depends on the nature of the sulphuration agent. The solvent selected may be one of the following solvents, used alone or as a mixture:

- a light petrol, for example with a boiling point of between 60° C. and 95° C.,
- a hexane type petrol with a boiling point of about 63° C. to 68° C.,
- an F type petrol with a boiling point of between about 100° C. and 160° C. and generally containing 10% to 20% of aromatic hydrocarbons, for example 15% by volume,
- a "white spirit" type petrol with a boiling point of between 150° C. and 250° C. and generally containing 14% to 22% of aromatic hydrocarbons, for example 17% by volume,
- or any hydrocarbon or other cut which is equivalent to the above petrols.

The agent can be used in another solvent such as an alcohol (methanol, ethanol, propanol etc. . . . ), aldehyde, ketone, ether, ester, polyalcohol, acid, polyacid or glycol. These compounds may also act as a reducing agent. Water is a further possible solvent.

Following impregnation, the catalyst is advantageously thermally treated, generally between 100° C. and 200° C.

Advantageously, in accordance with the present invention the catalyst incorporates 0.05% to 10%, preferably 0.2% to 1% of sulphur, expressed as the weight of sulphur with respect to the mass of the catalyst.

In general, the catalyst contains 0.02% to 2% by weight, preferably 0.05% to 1% advantageously 0.05% to 0.5%, of palladium The presulphurated catalyst thus obtained is then activated in the reactor before the feedstock is introduced. The isomerization reaction takes place at a pressure of between 1 and 50 bars (preferably 5 to 30 bars), a temperature of between 20° C. and 200° C. (preferably 50° C. to 150° C.), a VVH of between 0.5 and 10 $h^{-1}$ (preferably 1 to 6 $h^{-1}$), the molar $H_2$/olefin ratio being between 0.5 and 5 (preferably 1 to 3).

The following examples illustrate the invention without limiting its scope.

EXAMPLE 1 (COMPARATIVE)

100 $cm^3$ of LD 265 catalyst sold by SOCIETE PROCATALYSE (catalyst A) containing 0.3% by weight of palladium supported on alumina was placed in a 3 cm diameter steel tube. This catalyst, which is currently used for selective hydrogenation of steam cracking or FCC cuts, was activated as follows:

Sulphuration in the reactor in a gaseous $H_2/H_2S$ mixture (1% by volume of $H_2S$) at a flow rate of 30 l/h for 6 hours at 150° C., Reduction in hydrogen at a flow rate of 30 l/h for 5 hours at 200° C.

The catalyst was then cooled in a current of hydrogen followed by purging of the apparatus with nitrogen.

The hydrogenating and isomerizing activity of the catalyst was then measured using a hydrocarbon feedstock having a weight composition shown in Table 1:

|  | Content (weight %) |
| --- | --- |
| Isobutane | 30.0 |
| Butane | 10.0 |
| Trans 2-butene | 17.0 |
| 1-butene | 14.0 |
| Isobutene | 15.7 |
| Cis 2-butene | 13.0 |
| 1,3-butadiene | 0.3 |

This feedstock was passed with hydrogen in ascending flux mode over the catalyst bed under the following conditions:

| Pressure | = | 25 bar |
| --- | --- | --- |
| Temperature | = | 80° C. |
| $C_4$ cut flow rate | = | 1 000 $cm^3$/h |
| $H_2$/1,3-butadiene molar ratio | = | 2.2 |

The reactor effluents were analyzed by vapour phase chromatography using a 50 m path alumina column. The results obtained are shown in Table 2 below:

|  | Content (weight %) |
| --- | --- |
| Isobutane | 30.0 |
| Butane | 10.36 |
| Trans 2-butene | 23.36 |
| 1-butene | 6.08 |
| Isobutene | 15.7 |
| Cis 2-butene | 14.50 |
| 1,3-butadiene | 0 |

It appears that, under these conditions, catalyst A produces a 100% conversion of 1,3-butadiene and a 1-butene isomerisation ratio of 56.6%. The olefin yield was 99.4%.

EXAMPLE 2 (IN ACCORDANCE WITH THE INVENTION)

100 $cm^3$ of LD 265 catalyst sold by SOCIETE PROCATALYSE containing 0.3% by weight of palladium supported on alumina was dry impregnated with a 2.2 mole per liter aqueous solution of formic acid and 0.15 mole per liter of diethoxydisulphide. The impregnated catalyst was dried for 6 hours at 120° C. This catalyst was termed catalyst B. It was placed in a 3 cm diameter steel tube and activated as follows:

Reduction in hydrogen at a flow rate of 30 l/h for 5 hours at 200° C.

The catalyst was then cooled in a current of hydrogen followed by purging of the apparatus with nitrogen.

The hydrogenating and isomerizing activity of the catalyst was then measured using a feedstock having a composition as shown in Table 1 of Example 1.

This feedstock was passed with hydrogen in ascending flux mode over the catalyst bed under the conditions described for Example 1.

The reactor effluents were analyzed by vapour phase chromatography using a 50 m path alumina column. The results obtained are shown in Table 3 below:

|  | Content (weight %) |
|---|---|
| Isobutane | 30.0 |
| Butane | 10.36 |
| Trans 2-butene | 23.76 |
| 1-butene | 5.66 |
| Isobutene | 15.7 |
| Cis 2-butene | 14.52 |
| 1,3-butadiene | 0 |

It appears that under these conditions, catalyst B performs better then catalyst A of Example 1. 100% conversion of 1,3-butadiene was obtained with 59.6% isomerisation of 1-butene. The olefin yield remained at 99.4%.

We claim:

1. In a process for the isomerization of external olefins contained in a feedstock to internal olefins, said liquid feedstock containing diolefins, in the presence of a palladium based catalyst and in the presence of hydrogen, the isomerization conditions of the process corresponding to a temperature of between 20° C. and 200° C., a pressure of between 1 and 50 bars, a VVH of between 0.5 and 10 $h^{-1}$ and an H2/diolefin molar ratio of between 0.5 and 5, the improvement wherein the catalyst is treated, before being loaded into the isomerization reactor, with at least one sulphur-containing organic compound dissolved in a solvent; the resultant catalyst containing 0.05% to 10% by weight of sulphur, is loaded into the reactor and activated in a neutral or reducing atmosphere at a temperature of between 20° C. and 300° C., a pressure of between 1 and 50 bars and a VVH of between 50 and 600 $h^{-1}$; and the feedstock is brought into contact with said activated catalyst under said isomerization conditions.

2. A process according to claim 1, wherein the feedstock is a $C_4$ steam cracking cut, a $C_{5+}$ steam cracking cut, a $C_4$ catalytic cracking cut or a $C_{5+}$ catalytic cracking cut.

3. A process according to claim 1, the catalyst is constituted by palladium deposited on alumina.

4. A process according to claim 1, wherein the sulphur-containing compound is selected from the group consisting of organic alkyl or aryl sulphides, organic alkylaryl and arylalkyl sulphides, thiols, thiodiazoles, organic thioacids, thioamides, thioesters, thiophenols, mercapto-alcohols and monothioglycols.

5. A process according to claim 1, wherein the solvent is selected from the group consisting of petrols and hydrocarbon cuts.

6. A process according to claim 1, wherein the solvent is selected from the group consisting of alcohols, aldehydes, ketones, ethers, esters, polyalcohols, acids, polyacids and glycols.

7. A process according to claim 1, wherein the the solvent is water.

8. A process according to claim 1, wherein the activation is carried out between 60° C. and 210° C., at a pressure of 3 to 20 bars and a VVH of 100 to 200 $h^{-1}$.

9. A process according to claim 1, wherein the isomerisation is carried out between 50° C. and 150° C., at a pressure of 5 to 30 bars, a VVH of 1 to 6 $h^{-1}$ and an H₂/olefin molar ratio of 1 to 3.

10. A process according to claim 1, wherein the treatment before loading into the reactor is effected using diethoxydisulphide.

11. A process according to claim 1, wherein the catalyst contains 0.2% to 1% by weight of sulphur.

12. A process according to claim 1, wherein the catalyst contains 0.02% to 2% by weight of palladium.

13. A process according to claim 1, wherein the catalyst contains 0.05% to 1% by weight of palladium.

14. A process according to claim 1, wherein the catalyst contains 0.05% to 0.5% by weight of palladium.

15. A process according to claim 1, wherein said resultant catalyst containing 0.05 to 10% by weight of sulphur is handled in air prior to being loaded into the reactor.

16. A process according to claim 1, wherein no sulphur containing compound is added to the feedstock.

17. A process according to claim 15, wherein no sulphur containing compound is added to the feedstock.

\* \* \* \* \*